(12) United States Patent
Yoshida et al.

(10) Patent No.: US 7,773,305 B2
(45) Date of Patent: Aug. 10, 2010

(54) WIDE-ANGLE LENS AND IMAGE CAPTURING APPARATUS

(75) Inventors: Hayato Yoshida, Iwate (JP); Yasushi Takahashi, Iwate (JP); Naoki Moniwa, Iwate (JP); Toshiyuki Kawasaki, Kanagawa (JP); Ryosuke Kasahara, Kanagawa (JP); Issei Abe, Kanagawa (JP); Yukiko Hamano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/302,849

(22) PCT Filed: Mar. 25, 2008

(86) PCT No.: PCT/JP2008/056284

§ 371 (c)(1),
(2), (4) Date: Nov. 28, 2008

(87) PCT Pub. No.: WO2008/120775

PCT Pub. Date: Oct. 9, 2008

(65) Prior Publication Data

US 2009/0122422 A1 May 14, 2009

(30) Foreign Application Priority Data

Mar. 30, 2007 (JP) .............................. 2007-093188
Feb. 15, 2008 (JP) .............................. 2008-035263

(51) Int. Cl.
*G02B 3/00* (2006.01)
*G02B 9/00* (2006.01)
*G02B 13/18* (2006.01)
*G02B 3/02* (2006.01)
*G02B 9/34* (2006.01)

(52) U.S. Cl. ...................... 359/650; 359/715; 359/781

(58) Field of Classification Search ................. 359/649, 359/650, 715, 771, 781
See application file for complete search history.

(56) References Cited

U.S. PATENT DOCUMENTS 7,551,373 B2 * 6/2009 Hirose ........................ 359/781

FOREIGN PATENT DOCUMENTS

| JP | 11 161773 | 6/1999 |
|----|-----------|--------|
| JP | 2004 61763 | 2/2004 |
| JP | 2005 173191 | 6/2005 |
| JP | 2005 227426 | 8/2005 |
| JP | 2006 224927 | 8/2006 |
| JP | 2006 345053 | 12/2006 |
| JP | 2006 351017 | 12/2006 |
| JP | 2007 60647 | 3/2007 |

OTHER PUBLICATIONS

I. A. Cunningham, et al., "A Method for Modulation Transfer Function Determination From Edge Profiles with Correction for Finite-element Differentiation", *Medical Physics*, vol. 14, No. 4, 1987, pp. 533-537.

* cited by examiner

*Primary Examiner*—Alicia M Harrington
(74) *Attorney, Agent, or Firm*—Oblon, Spivak, McClelland, Maier & Neustadt, L.L.P.

(57) ABSTRACT

A wide-angle lens is disclosed that includes a front lens group and a rear lens group that are arranged in order from an object side to an image side with an aperture being arranged between the front lens group and the rear lens group. The front lens group includes at least two lenses arranged toward the object side that have negative powers, and at least one lens arranged toward the image side that has a positive power. The rear lens group includes at least one lens having a positive power. One of the lenses of the front lens group arranged second in order from the object side has a lens face that is arranged into an aspheric surface. The front lens group, the aperture, and the rear lens group make up an image forming system having an angle of view greater than 180 degrees.

9 Claims, 12 Drawing Sheets

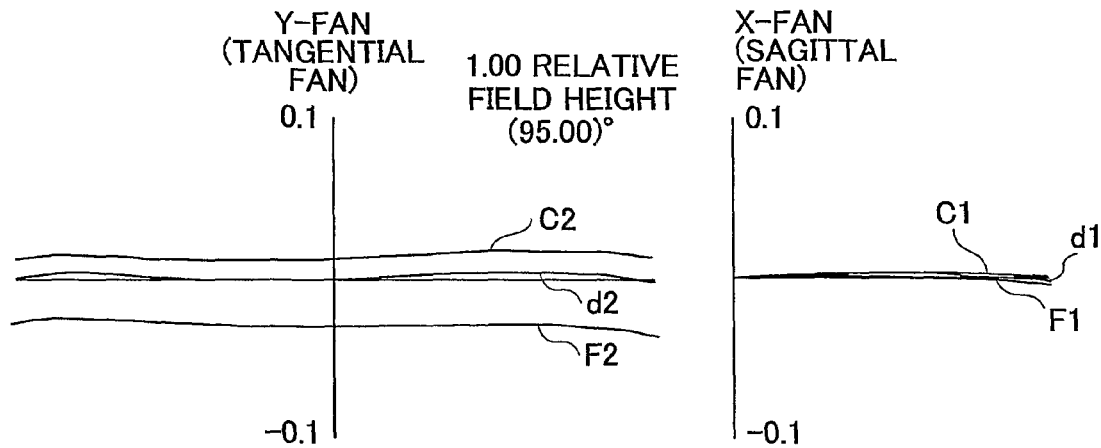
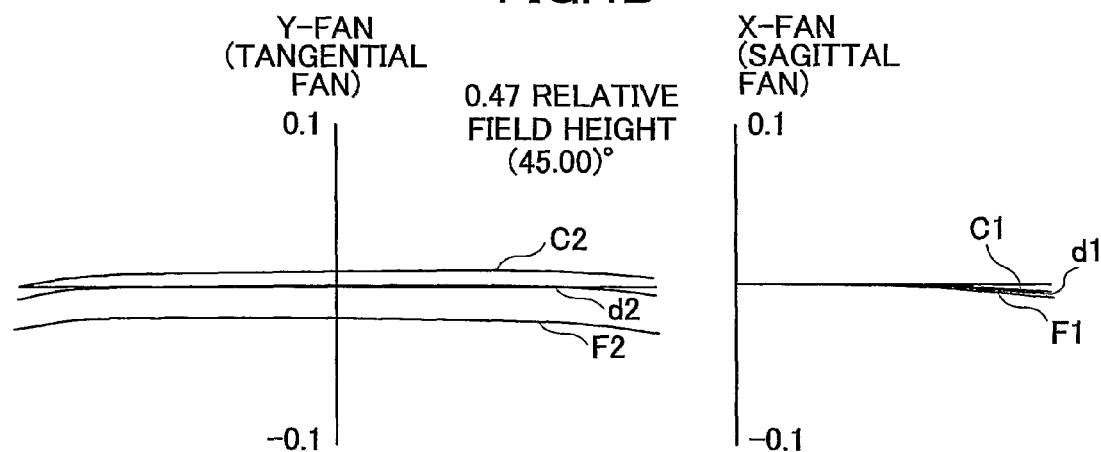
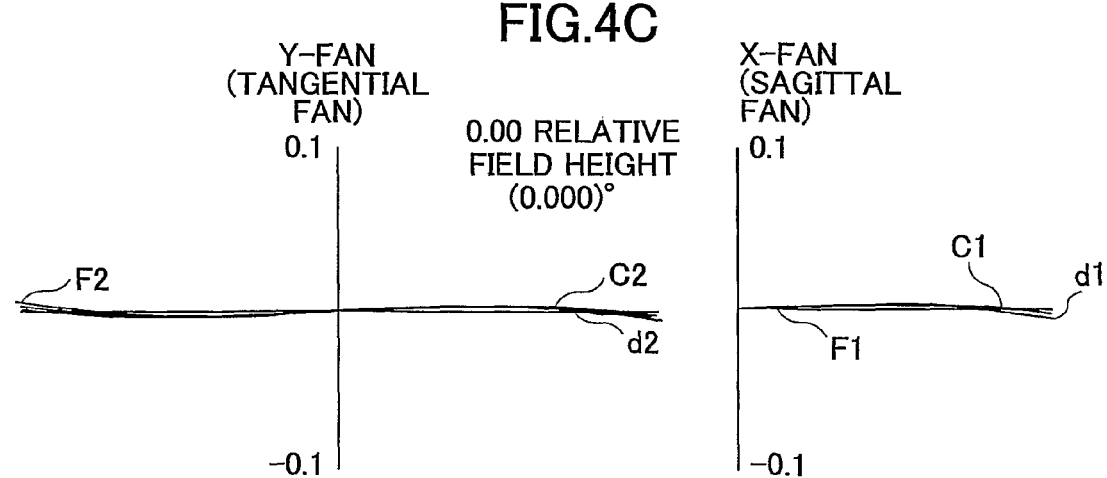

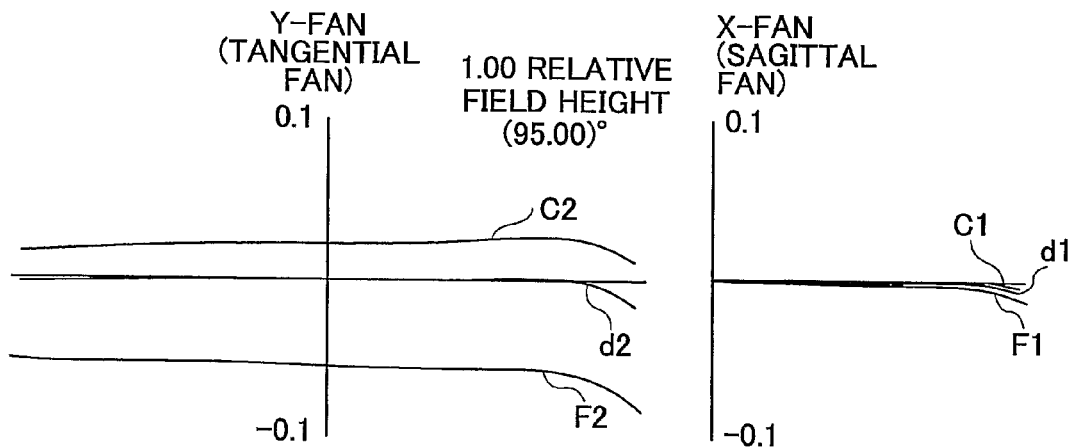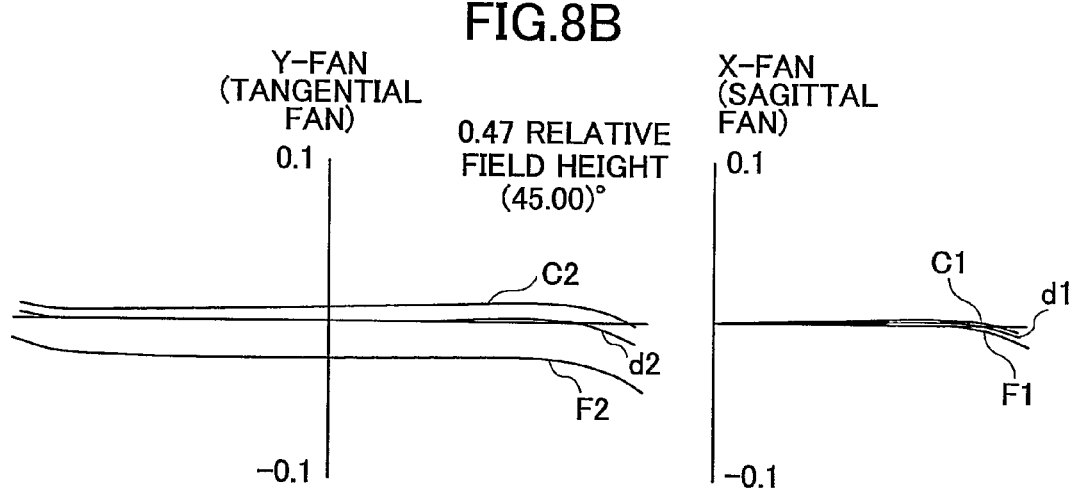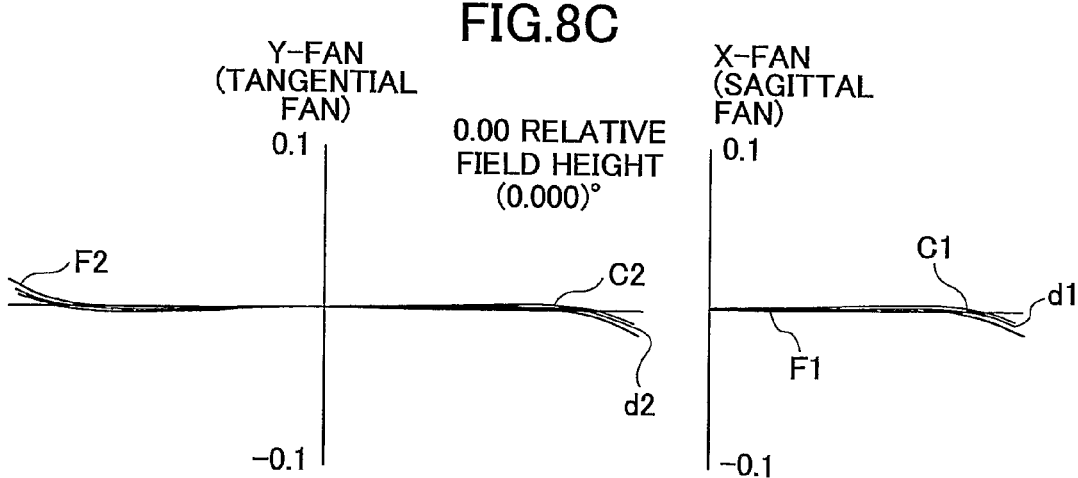

WIDE-ANGLE LENS AND IMAGE CAPTURING APPARATUS

TECHNICAL FIELD

The present invention relates to a wide-angle lens with an angle of view greater than 180 degrees and an image capturing apparatus.

BACKGROUND ART

A wide-angle lens may be used in various applications including cameras installed in vehicles and security cameras, for example. With respect to an image capturing lens of a camera installed in a vehicle, techniques for capturing a clear image with a wide angular range are in demand. Additionally, there is a growing demand for a technique for enabling simultaneous capture of a wider angular range of view exceeding 180 degrees in the left and right directions.

One advantage of securing an angular range of view exceeding 180 degrees in the left and right directions with an image capturing lens of a camera installed a vehicle is that image information of the surrounding view of the vehicle in all directions, namely, front, back, left, and right directions, may be captured, free of dead angles, by arranging one image capturing lens at each of four sides of the vehicle, for example.

It is noted that an apparatus for capturing the surrounding image of a vehicle is disclosed in Japanese Laid-Open Patent Publication No. 2006-224927, for example.

Also, a fish-eye type wide-angle image capturing lens including four lenses that can secure a view of at least 180 degrees in the left and right directions is disclosed in Japanese Laid-Open Patent Publication No. 2005-227426, for example.

According to the above disclosure, aspheric surface lenses made of plastic material is used and the number of lenses making up the image capturing lens is reduced to four lenses in an attempt to achieve miniaturization and weight reduction. However, there are limits to achieving cost reduction and miniaturization using the above-disclosed technique because the object side lens (first lens) of the disclosed lens structure has a relatively large radius. Also, because plastic that may be used as lens material has a limited refractive index/Abbe number range, chromatic aberration of magnification may not be adequately corrected and color fringing may easily occur. Thus, the lens thickness may not be adequately reduced which in turn becomes an obstacle to reducing the size of the image capturing lens. Further, because a relatively large number of lenses with aspheric surfaces are used, image degradation may occur due to assembling errors in the manufacturing process or changes in the usage environment such as the temperature.

DISCLOSURE OF THE INVENTION

One aspect of the present invention is directed to providing a miniaturized image capturing apparatus that is capable of capturing a high-quality image with an angular range of view exceeding 180 degrees using a wide-angle lens, an image capturing device that converts an image formed by the wide-angle lens into an image signal, and an electronic circuit that performs correction processes on the image signal to correct influences of distortion, chromatic aberration of magnification, and MTF (Modulation Transfer Function) characteristics of the wide-angle lens reflected in the image signal.

Another aspect of the present invention is directed to providing a miniaturized wide-angle lens used in such an image capturing apparatus that has a dimension of no more than 15 mm in the optical axis directions and an angle of view exceeding 180 degrees.

According to one embodiment of the present invention, a wide-angle lens is provided that includes:

a front lens group and a rear lens group that are arranged in order from an object side toward and image side, an aperture being arranged between the front lens group and the rear lens group; wherein the front lens group includes at least two lenses arranged toward the object side that have positive powers, and at least one lens arranged toward the image side that has a negative power;

the rear lens group includes at least one lens having a positive power;

one of the lenses of the front lens group arranged second in order from the object side has a lens face arranged into an aspheric surface; and the front lens group and the rear lens group are arranged into an image forming system having an angle of view greater than 180 degrees.

According to another embodiment of the present invention, an image capturing apparatus is provided that includes:

an optical system including a wide-angle lens according to an embodiment of the present invention;

an image capturing unit that converts an object image formed by the optical system into image data;

a memory that stores the image data obtained by the image capturing unit;

a memory output control circuit that reads relevant image data corresponding to a designated angle of view from the memory;

a first signal processing circuit that performs distortion correction on the relevant image data for correcting influences of distortion of the optical system reflected in the relevant image data;

a second signal processing circuit that performs chromatic aberration of magnification correction on the relevant image data for correcting influences of chromatic aberration of magnification of the optical system reflected in the relevant image data; and a third signal processing circuit that performs modulation transfer function correction on the relevant image data for correcting influences of modulation transfer function characteristics of the optical system reflected in the relevant image data.

Other objects, features and advantages of the present invention will become more apparent from the following detailed description when read in conjunction with the accompanying drawings.

BRIEF DESCRIPTION OF THE DRAWINGS

FIGS. 4A-4C are graphs showing exemplary coma characteristics of the wide-angle lens according to the first specific embodiment at differing relative field heights;

FIGS. 8A-8C are graphs showing exemplary coma characteristics of the wide-angle lens according to the second specific embodiment at differing relative field heights;

BEST MODE FOR CARRYING OUT THE INVENTION

Figure 1:
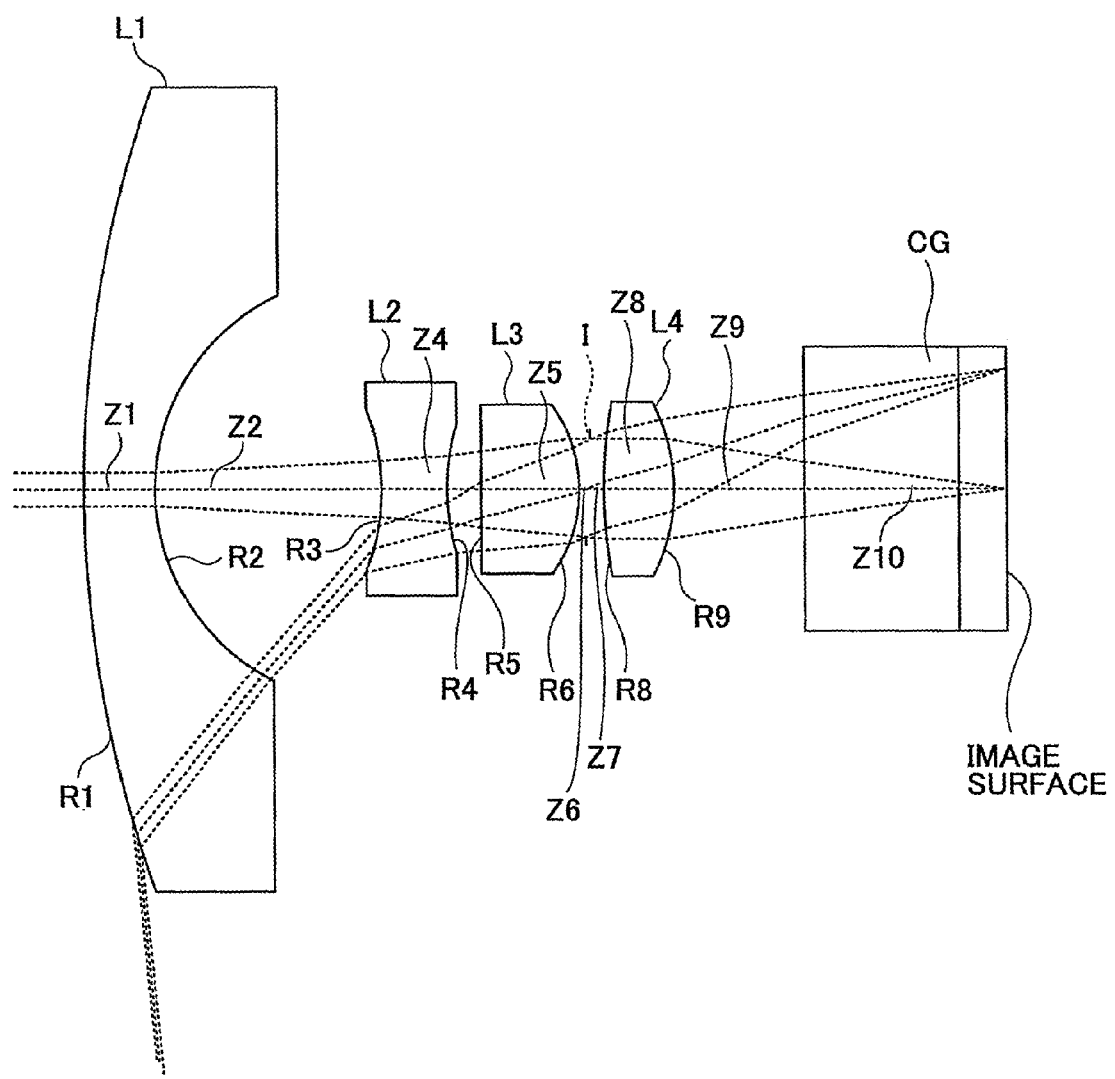
FIG. 1 is a diagram showing a configuration of a wide-angle lens according to a first specific embodiment of the present invention.

A wide-angle lens according to an embodiment of the present invention includes a front lens group and a rear lens group that are arranged in order from the object side to the image side with an aperture being arranged between the front lens group and the rear lens group. Specifically, the front lens group and the rear lens group make up an image forming system including four lenses. It is noted that the four lenses making up the image forming system are independent lenses as opposed to being lens elements of a cemented lens.

The front lens group is arranged to have a power distribution of: negative/negative/positive; and the power of the rear lens group is arranged to be positive.

Also, a lens of the front lens group with a negative power that is arranged second in order from the object side has a lens face that is arranged into an aspheric surface.

In the present embodiment, the front lens group may include three lenses to realize the power distribution of negative/negative/positive, and the rear lens group may include one lens having a positive power.

Also, the angle of view of the wide-angle lens according to the present embodiment is arranged to be greater than 180 degrees.

It is noted that the front lens group is preferably configured to minimize generation of aberrations upon guiding off-axis light through the aperture toward the rear lens group. Accordingly, light refraction at the lens faces of the front lens group is preferably arranged to be low.

In the present embodiment, light refraction at the lens faces of the front lens group may be suppressed by arranging the front lens group to have the power distribution of negative/negative/positive.

It is noted that the rear lens group is preferably configured to perform correction of optical aberrations such as astigmatism, coma, and chromatic aberration. In the present embodiment, the rear lens group is arranged to have a positive power so that aberration correction may be effectively performed and image forming capability of image light that is to form an image on an image surface of the wide-angle lens may be enhanced.

It is noted that in a wide-angle lens according to an embodiment of the present invention that uses a relatively small number of lenses (i.e., four) to construct an image forming system, aberration correction capability of each of the lenses may have a strong influence on the overall optical performance of the wide-angle lens. Accordingly, variations created during manufacture of the individual lenses may cause notable optical performance degradation. Particularly, optical performance degradation due to variations created at the lens manufacturing stage is prone to occur when a large number of lenses with aspheric surfaces are used.

Specifically, in the case of using an aspheric surface lens, eccentricity and positional deviations of the aspheric surface are prone to cause significant variations in the aberration of the overall lens system, and even slight positional deviations between lenses or a slight eccentricity in the optical axes of lens faces may have a significant impact on the optical performance of the lens system. Thus, in order to obtain a good quality image using an aspheric surface lens, finer adjustment has to be performed on the aspheric surface lens compared to adjustment performed on a spherical lens. As can be appreciated, when a relatively large number of aspheric surface lenses are used or a lens with an aspheric surface that increases the angle of refraction of the lens is used, the lens production yield may be degraded and variations are prone to occur between individual lenses so that there may be a significant difference between optical performance of the lens system according to design and the optical performance of the manufactured lens system.

In a wide-angle lens according to an embodiment of the present invention, one lens face of the second lens of the front lens group is arranged into an aspheric surface. That is, the present embodiment addresses the problem of optical performance degradation due to variations created in the manufacturing or assembling stage as is described above by arranging the number of aspheric surfaces of the front lens group to a minimum of one lens face (i.e., third lens face or fourth lens face).

In one preferred embodiment of the present invention, the rear lens group may also be arranged to include an aspheric lens surface in order to enable accurate correction of aberrations created at the front lens group. Specifically, the image side lens face of the lens belonging to the rear lens group is preferably arranged into an aspheric surface.

According to this embodiment, the number of aspheric surfaces used in the wide-angle lens may be limited to lens surfaces; namely, one lens face of each of the front lens group and the rear lens group is arranged into an aspheric surface. In this way, optical degradation due to variations in created at the manufacturing stage may be reduced and optical performance of the wide-angle lens may be stabilized.

Also, in a wide-angle lens according to a further preferred embodiment of the present invention, the front lens group includes three lenses: a first lens having a negative power, a second lens having a negative power, and a third lens having a positive power; and the rear lens group includes a fourth lens having a positive power.

In a wide-angle lens according to a further preferred embodiment of the present invention, the Abbe number of the first lens, denoted by vd1; the Abbe number of the second lens, denoted by vd2; the Abbe number of the third lens, denoted by vd3; and the Abbe number of the fourth lens, denoted by vd4 are arranged to satisfy the following conditions:

$$vd1 \leq 40; \quad (1)$$

$$vd2 \leq 25; \quad (2)$$

$$vd3 \geq 60; \text{ and} \quad (3)$$

$$vd4 \geq 6. \quad (4)$$

It is noted that in a wide-angle lens, off-axis chromatic aberration has a relatively large influence on image quality. Accordingly, in the case where the front lens group includes three lenses and the rear lens group includes one lens to make up an imaging forming system having four lenses, the materials of the first through fourth lenses are preferably arranged to satisfy the above conditions (1) through (4) so that off-axis chromatic aberration may be effectively corrected.

Also, it is noted that a wide-angle lens according to an embodiment of the present invention is configured to be used in conjunction with an image capturing device that converts an image formed by the wide-angle lens into an image signal and an electronic circuit that performs correction processes on the image signal to correct influences of distortion, chromatic aberration of magnification, and MTF characteristics of the wide-angle lens reflected in the image signal. Accordingly, an aspect of the present invention is directed to improving image quality of an observation image obtained as a result of performing correction processes on the image formed by a wide-angle lens according to an embodiment of the present invention. In this respect, a wide-angle lens according to an embodiment of the present invention is preferably arranged to have aberrations that may be adequately corrected by the correction processes of the electronic circuit so that a high quality observation image may be obtained.

Also, in a wide-angle lens according to a another preferred embodiment of the present invention, the distance from a first lens face of the first lens to a second lens face of the fourth lens, denoted by OAL1;and the diameter of an image circle formed on the image surface of the wide-angle lens are arranged to satisfy the following condition:

$$OAL1/I\phi \leq 2.68. \quad (5)$$

It is noted that when the value of OAL1/Iφ exceeds the maximum value prescribed in the above condition (5), the length of the overall lens system may become too large with respect to the size of the image circle so that the wide-angle may not be adequately miniaturized, or the image circle may become too small with respect to the overall lens length to cause resolution degradation, for example.

Also, in a wide-angle lens according to a another preferred embodiment of the present invention, at least one of the lenses of the front lens group and the rear lens group that has the strongest power is arranged to be a glass lens. It is noted that an image capturing apparatus including a wide-angle lens according to an embodiment of the present invention may possibly be used under varying environmental conditions. For example, under usage conditions in which temperatures may have variations of several dozen degrees, if a lens having the strongest power is made of plastic material, the temperature variations may cause wide variations in the power of this plastic lens so that the optical performance of the wide-angle lens may be prone to degradation.

Accordingly, by arranging the lens with the strongest power to be a glass lens, optical performance degradation due to environmental condition variations as described above may be reduced. In a further embodiment, glass lenses may be used for all of the lenses making up the wide-angle lens system so that optical degradation may be effectively prevented even under extremely harsh usage conditions.

An image capturing apparatus according to an embodiment of the present invention includes an optical system, an image capturing device, a memory, a memory output control circuit, and first through third signal processing circuits.

The optical system includes a wide-angle lens according to an embodiment of the present invention. For example, the optical system may use a wide-angle lens according to a first specific embodiment or a second specific embodiment described in detail below.

The image capturing device has pixels arranged in a two-dimensional pattern and is configured to convert an image formed by the optical system into an image signal. For example, an area sensor such as a CCD may be used as the image capturing device.

The memory is used for storing the converted image data obtained by the image capturing device.

The memory output control circuit is configured to read relevant image data corresponding to a designated angle of view from the memory.

The first signal processing circuit is configured to perform distortion correction on image data for correcting influences of distortion of the optical system reflected in the image data.

The second signal processing circuit is configured to perform chromatic aberration of magnification correction on image data for correcting influences of chromatic aberration of magnification of the optical system reflected in the image data.

The third signal processing circuit is configured to perform MTF correction on image data for correcting influences of MTF characteristics of the optical system reflected in the image data.

It is noted that a conventional wide-angle lens has to be designed to achieve desirable MTF characteristics in peripheral areas while adequately correcting optical aberrations such as on-axis chromatic aberration, chromatic aberration of magnification, and distortion within the lens. For example, to maintain a resolution of 50 lp/mm in the peripheral areas, the distance from the first lens face to the image surface of the wide-angle lens system as to be at least 15 mm. However, according to an embodiment of the present invention, a part of the aberration corrections are performed by electronic processes of an electronic circuit so that a wide-angle lens according to an embodiment of the present invention may not be required to achieve desirable MTF characteristics in peripheral areas while adequately correcting optical aberrations such as on-axis chromatic aberration, chromatic aberration of magnification, and distortion on its own. Accordingly, design requirements of a wide-angle lens according to an embodiment of the present invention may be eased, and a lens system that enables output of a high-quality observation image through processing by an electronic circuit may be configured using four lenses. For example, the distance from the first lens face to the image surface of a wide-angle lens according to an embodiment of the present invention may designed to be less than 15 mm, or even less than 10 mm.

Also, it is noted that the four lenses making up a wide-angle lens according to an embodiment of the present invention are independent lenses that do not have to be bonded or cemented. Accordingly, a wide-angle lens according to an embodiment may be manufactured without a cementing step to thereby reduce manufacturing costs. Also, a wide-angle lens according to an embodiment may have a wide angle of view exceeding 180 degrees (e.g., 190 degrees in the first and second specific embodiments described below).

Also, a glass lens may be used for at least one of the lenses with the strongest power of a wide-angle lens according to an embodiment so that environmental resistance characteristics may be improved and the wide-angle lens may be adapted for use under harsh environmental conditions, for example.

Also, an image capturing apparatus according to an embodiment of the present invention uses the first through third signal processing circuits as described above to correct influences of distortion, chromatic aberration of magnification, and MTF characteristics of its optical system including a wide-angle lens according to an embodiment in order to obtain an observation image with desirable image quality.

In the following, specific embodiments of the present invention are described with reference to the accompanying drawings.

FIG. 1 is a diagram showing a configuration of a wide-angle lens according to a first specific embodiment of the present invention.

The illustrated wide-angle lens according to the first specific embodiment includes a first lens L1, a second lens L2, a third lens L3, and a fourth lens L4 that are arranged in this order from the object side (left side of FIG. 1), and an aperture I arranged between the third lens L3 and the fourth lens L4.

It is noted that the first lens L1, the second lens L2, and the third lens L3 belong to a front lens group and the fourth lens L4 belongs to a rear lens group. The first through fourth lenses L1-L4 are independent lenses that are not cemented together.

Figure 5:
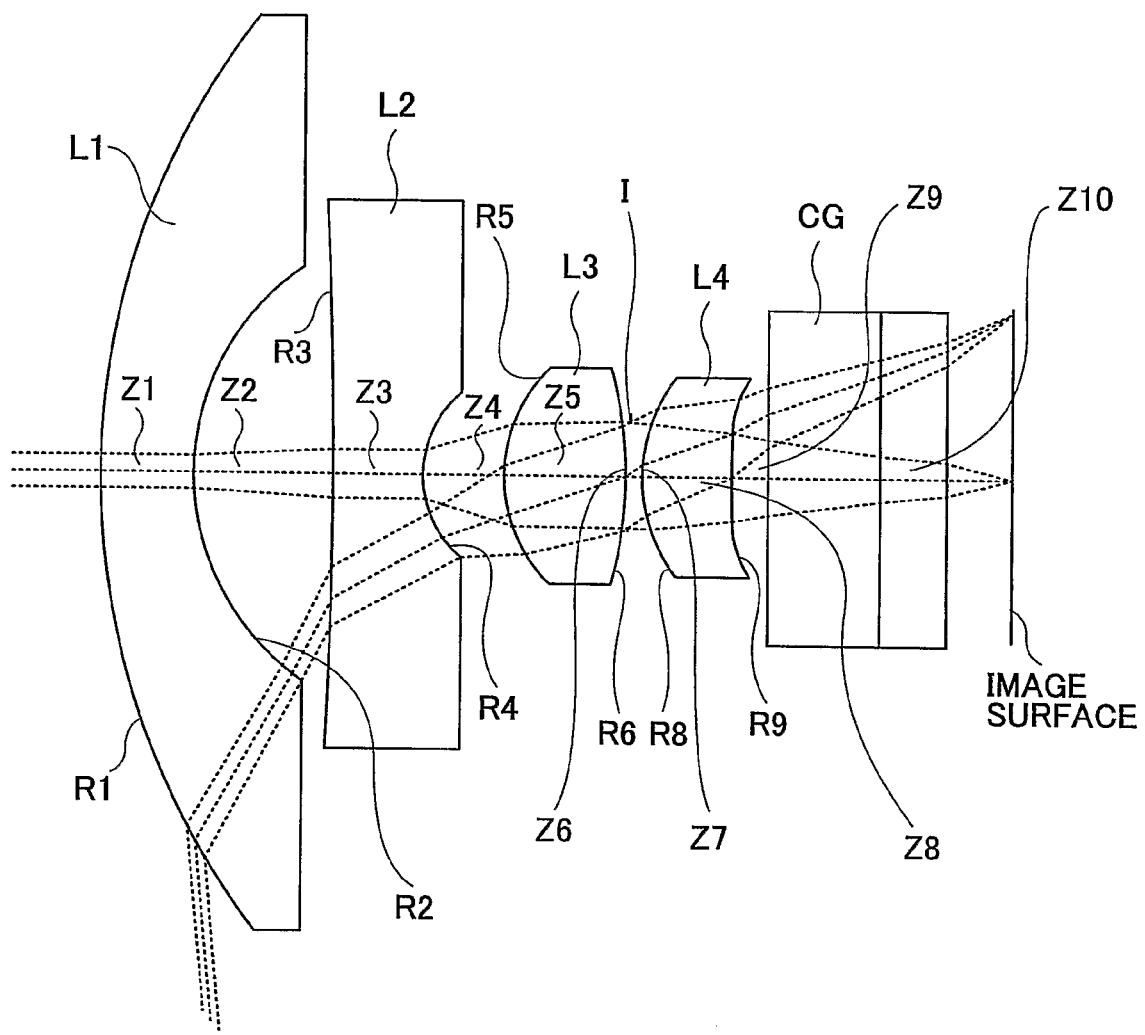
FIG. 5 is a diagram showing a configuration of a wide-angle lens according to a second specific embodiment of the present invention.
Figure 6:
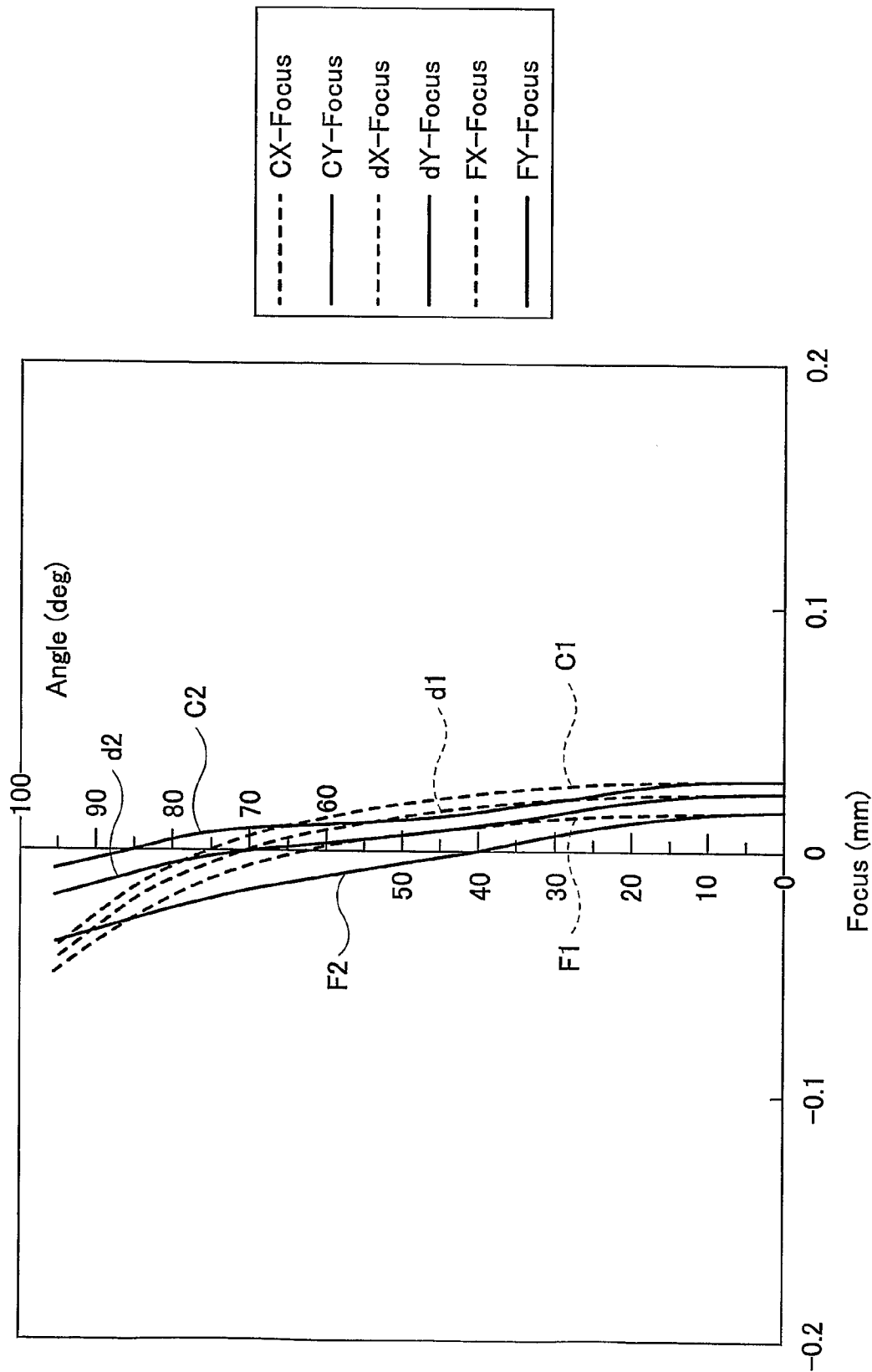
FIG. 6 is a graph showing exemplary astigmatism characteristics of the wide-angle lens according to the second specific embodiment.
Figure 7:
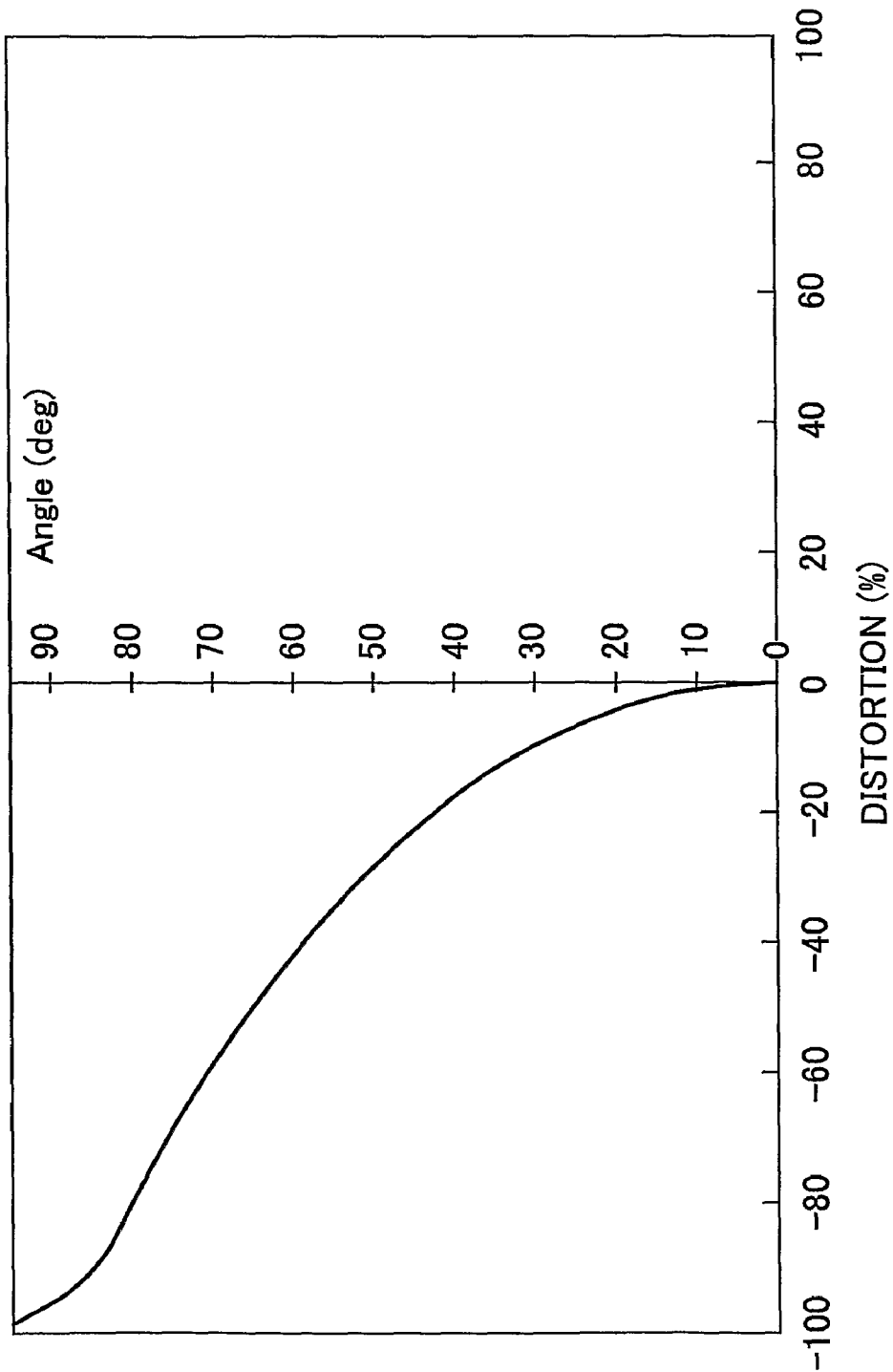
FIG. 7 is a graph showing exemplary distortion characteristics of the wide-angle lens according to the second specific embodiment.

FIG. 5 is a diagram showing a configuration of a wide-angle lens according to a second specific embodiment of the present invention. It is noted that component elements of FIG. 5 corresponding to those of FIG. 1 that are not likely to be confused are assigned the same reference numbers.

As with the first specific embodiment, the wide-angle lens according to the second specific embodiment includes a first lens L1, a second lens L2, a third lens L3, and a fourth lens L4 that are arranged in this order from the object side (left side of FIG. 5), and an aperture I arranged between the third lens L3 and the fourth lens L4.

The first lens L1, the second lens L2, and the third lens L3 belong to a front lens group, and the fourth lens L4 belongs to a rear lens group. The first through fourth lenses L1-L4 are independent lenses that are not cemented.

In the first and second specific embodiments shown in FIGS. 1 and 5, the first and second lenses L1 and L2 have negative powers (negative focal lengths), and the third and fourth lenses L3 and L4 have positive powers (positive focal lengths).

Also, as is described in detail below, one lens face of the second lens L2 is arranged into an aspheric surface in both the first and second specific embodiments. Further, in the second specific embodiment, the image side lens face of the fourth lens L4 is arranged into an aspheric surface.

More specifically, the wide-angle lens according to the first specific embodiment as shown in FIG. 1 and the wide-angle lens according to the second specific embodiments as shown in FIG. 5 each include four independent lenses that make up an image forming system as a whole, the lenses belonging to a front lens group (e.g., first lens L1 through third lens L3) and a rear lens group (e.g., fourth lens L4) that are arranged in order from the object side to the image side, an aperture being arranged between the front lens group and the rear lens group. The power distribution of the front lens group is arranged to be: negative (first lens L1)/negative (second lens L2)/positive (third lens L3). The power of the rear lens group (fourth lens L4) is arranged to be positive. The lens of the front lens group with a negative power that is arranged second in order from the object side (second lens L2) has one lens face that is arranged into an aspheric surface.

Also, in the wide-angle lens according to the second specific embodiment as shown in FIG. 5, the image side lens face of the lens belonging to the rear lens group (fourth lens L4) is also arranged to be an aspheric surface.

Also, the wide-angle lens according to the first specific embodiment as shown in FIG. 1 and the wide-angle lens according to the second specific embodiments as shown in FIG. 5 each have an angle of view exceeding 180 degrees (i.e., 190 degrees) and is arranged into a two-group four-lens configuration with the front lens group including a first lens L1 with negative power, a second lens L2 with negative power, and a third lens with positive power; and the rear lens group including a fourth lens L4.

Also, the Abbe number vd1 of the first lens L1, the Abbe number vd2 of the second lens L2, the Abbe number vd3 of the third lens L3, and the Abbe number vd4 of the fourth lens L4 are arranged to satisfy the following conditions:

$$vd1 \leq 40 \qquad (1)$$

$$vd2 \leq 25 \qquad (2)$$

$$vd3 \geq 60 \qquad (3)$$

$$vd4 \geq 60 \qquad (4)$$

Also, the distance OAL1 from a first lens face of the first lens L1 to a second lens face of the fourth lens L4 and the diameter I$\phi$ of an image circle formed on the image surface are arranged to satisfy the following condition:

$$OAL1/I\phi \leq 2.68 \qquad (5)$$

Also, the first through fourth lenses L1-L4 of the wide-angle lenses shown in FIGS. 1 and 5 are all glass lenses. It is noted that the third lens L3 is arranged to have the strongest power in the wide-angle lenses shown in FIGS. 1 and 5.

Also, the wide-angle lenses of FIGS. 1 and 5 each have a cover glass CG for covering an image capturing device (CCD area sensor).

In the following, signal processing performed by an image capturing apparatus according to an embodiment of the present invention is described with reference to FIGS. 9-12.

Figure 12:
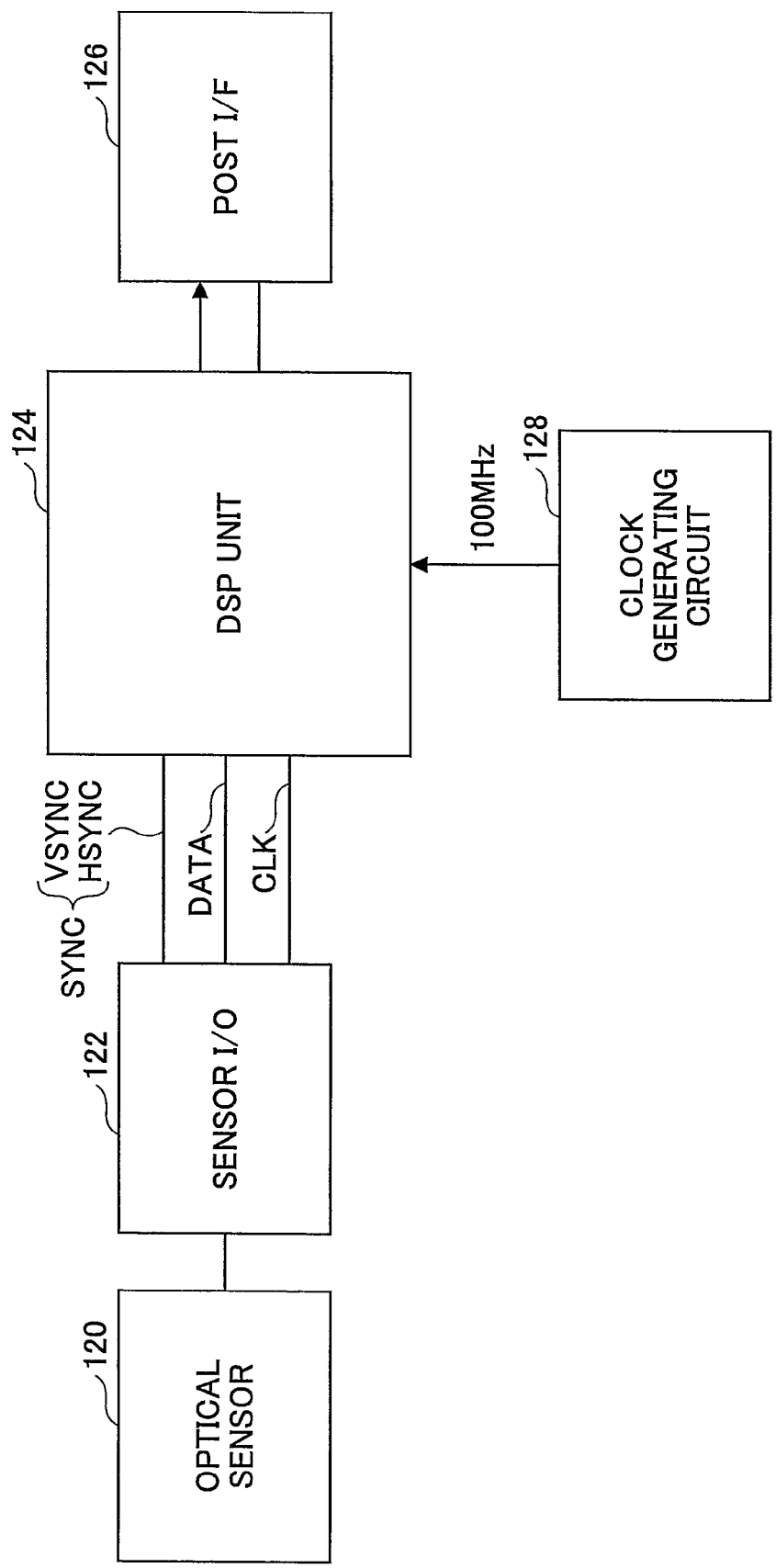
FIG. 12 is a block diagram showing another exemplary configuration of a signal processing system according to an embodiment of the present invention.

FIG. 12 is a block diagram showing an exemplary configuration of a signal processing system according to an embodiment of the present invention.

The illustrated signal processing system includes an optical sensor 120 that guides an image light flux generated by an optical system employing a wide-angle lens (not shown) onto its light receiving surface to form an image thereon. The optical sensor 120 may be a CCD or a MOS type image capturing device, for example. Moreover, the optical sensor 120 may be any type of color sensor such as an RGB primary color sensor or a complimentary color sensor.

The output of the optical sensor 120 is output via a sensor I/O 122.

In the illustrated example of FIG. 12, the sensor I/O 122 outputs the signals SYNC (V-SYNC, H-SYNC), DATA, and CLK (clock). However, the present invention is not limited to such an example, and any type of data including analog signals, digital signals, and composite signals may be output as the sensor output. In one example, the DATA signal may include 10 bits of data for each of the colors R, G, and B; and the CLK signal may have a frequency of 25 MH (megahertz).

The signals SYNC, DATA, and CLK are transmitted to a DSP unit 124 corresponding to a core unit of the signal processing unit.

The DSP unit 124 includes functions of a memory, a memory output control unit, and first through third signal processing circuits. The hardware configuration of the DSP unit 124 is not limited to a particular type, and may be an ASIC or a programmable logic such as FPGA or DSP that is configured to perform processes on input signals as described below. Also, in the present example, a clock signal with a frequency of 100 MH is input to the DSP unit 124 from a clock generating circuit 128.

The output of the DSP unit 124 is converted by a post I/F 126 to be in a specified format. For example, the output of the DSP unit 124 may be converted into the YUV 422 format, the YUV 444 format, or the YUV 221 format. In the present example, it is assumed that the output is converted into the NTSC format.

Figure 9:
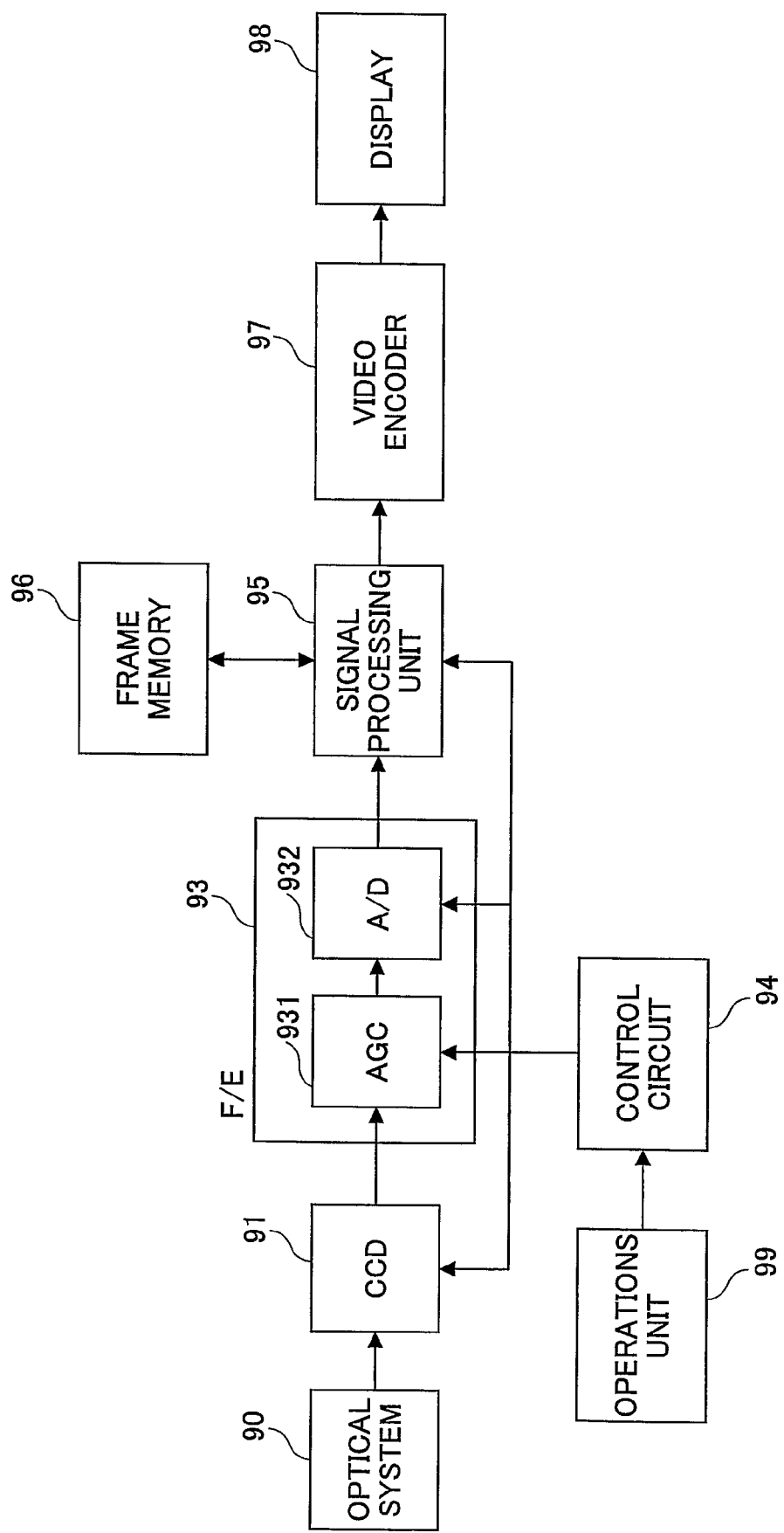
FIG. 9 is a block diagram showing an exemplary configuration of a signal processing system according to an embodiment of the present invention.

FIG. 9 is a block diagram showing another exemplary configuration of a signal processing system according to an embodiment of the present invention.

The signal processing system of FIG. 9 includes an optical system 90 that employs a wide-angle lens, an image capturing device (CCD area sensor) 91, and a pre-processing unit 93.

An image formed on the image surface of a wide-angle lens corresponding to the optical system 90, which may be the wide-angle lens shown in FIG. 1 or FIG. 5, for example, is captured by the image capturing device 91 and converted into image data. It is noted that the image formed on the image surface of the wide-angle lens includes influences of distortions and chromatic aberration of magnification of the wide-angle lens.

The image data output by the image capturing device 91 are input to the pre-processing unit 93 at which an automatic gain control process is performed on the image data by an automatic gain controller 931 after which the processed image data are converted by an analog-to-digital converter (ADC) 932 into digital image data. It is noted that the automatic gain controller 931 is controlled by a control circuit 94 through operations of an operations unit 99. Also, it is noted that the image capturing unit 91 is not limited to a CCD area sensor and may alternatively be a MOS type image capturing device or an image capturing tube such as Vidicon or Chalnicon, for example.

The digital image data are then subject to image processes by a signal processing unit 95. The image processes performed by the signal processing unit 95 include adjusting problems caused by the image capturing device 91 and adjusting problems caused by the wide-angle lens (optical system) 90, for example.

Specifically, the pixel pattern of the image capturing unit 91 may be the so-called Bayer pattern that has a greater number of green (G) pixels compared to red (R) and blue (B) pixels. In creating images of the colors R, G, and B, if image data of R, G, and B are simply extracted and combined, variations in the pixel pattern of the color images may cause misalignment of the color images, for example. Accordingly, the signal processing unit 95 performs image capturing device-related correction processes such as re-patterning of pixels and RGB white balance correction. Then, the processing unit 95 performs optical system-related correction processes for correcting image degradation factors caused by the optical system 90 such as chromatic aberration of magnification, distortion, and MTF degradation included in the image data.

It is noted that image data of R, G, and B color images are stored in a frame memory 96 in the present example. Thus, upon performing the above-described image processes, relevant image data corresponding to a given angle of view are read from the frame memory 96 as is necessary by memory output control means included in the control circuit 94 to be processed by the processing unit 95.

Figure 10:
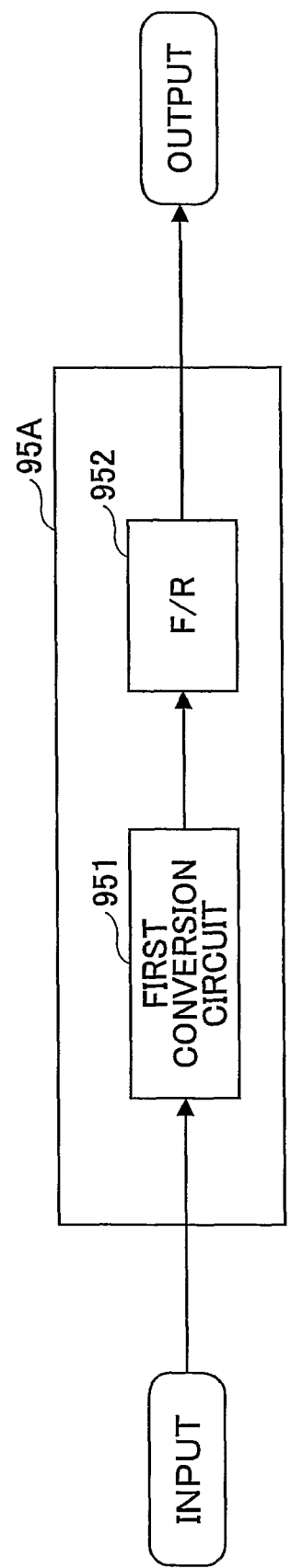
FIG. 10 is a block diagram showing an exemplary configuration of a signal processing module according to an embodiment of the present invention for correcting chromatic aberration of magnification, distortion, and MTF degradation.

FIG. 10 is a diagram illustrating image processes for correcting chromatic aberration of magnification, distortion, and MTF degradation.

In the illustrated example of FIG. 10, a processing module 95A of the signal processing unit 95 is configured to perform image processes for correcting chromatic aberration of magnification, distortion, and MTF degradation of input image data using first, second, and third signal processing circuits, respectively.

Specifically, digital image data that have undergone image capturing device-related correction processes are input to a first conversion circuit 951, and distortion correction is performed on the input digital image data by the first signal processing circuit, which is included in the first conversion circuit 951. The first signal processing circuit is configured to correct distortions of the digital image data by performing a process of remapping coordinates of an input image to coordinates of an output image for each set of image data of the R, G, and B color images taking into account the image distortions caused by distortions of the optical system 90.

It is noted that distortions of a wide-angle lens are characteristics that may be known beforehand. Thus, a conversion expression for converting coordinates of an input image into coordinates of an output image may be determined based on such characteristics, and correction may be performed using this conversion expression. For example, the conversion expression may be a quadratic expression that is obtained through approximation.

By performing distortion correction on each of the R, G, and B color images individually, the chromatic aberration of magnification of the images may also be corrected at the same time. In other words, in the present example, the first signal processing circuit for correcting distortion and the second signal processing circuit for correcting chromatic aberration of magnification are combined. It is noted that shading may occur as a result of changes in the light distribution caused by compression/decompression of pixels through use of the above-described conversion expression. Accordingly, in one preferred embodiment, light intensity variations may be corrected by multiplying the light intensity of each pixel by a corresponding coefficient that is determined according to the area magnification rate of the pixel, for example.

Then, image data that have undergone distortion/chromatic aberration of magnification correction in the above-described manner are subject to MTF degradation correction. Specifically, processes such as deconvolution are performed on the image data at a finite impulse response (FIR) filter 952 including the third signal processing unit for correcting MTF degradation. In certain preferred embodiments, a Wiener filter or a high pass filter (HPF) may be used as the FIR filter 952.

In this way, influences of chromatic aberration of magnification and distortion of a wide-angle lens of the optical system 90 that are reflected in an image may be corrected and MTF degradation that may occur at peripheral portions of the image may be corrected to thereby output an adequately corrected image.

In the case of outputting a still image, bitmap data or jpeg images may be created from the corrected R, G, and B color images, for example. In the case of outputting a moving image, a video encoder 97 as is shown in FIG. 9 may be used to create images in a suitable moving image format such as H.264, MPEG-2, or MPEG-4 from the corrected R, G, and B color images; and the moving images may be converted into NTSC, D2, D4, or component video signals to be output to a display 98 using a high definition multimedia interface (HDMI) or a digital visual interface DVI, in the case of digital output, or using an analog-to-digital converter circuit, in the case of analog output.

In the following, two specific embodiments of wide-angle lenses are described. It is noted that in both of these specific embodiments, the F number according to design is set to 2.8, and the design wavelength is set to 587.56 nm.

Also, in both of these specific embodiments, the aspheric surface of the wide-angle lens may be defined by the following expression:

$$Z=(h^2/R)/[1+\{1-(1+K)(h^2/R^2)\}^{1/2}]+Ah^2+Bh^4+Ch^6$$

where h represents a coordinate in the vertical direction with respect to the optical axis; Z represents a coordinate in the optical axis direction; R represents a paraxial radius of curvature; K represents a conic constant; and A, B, and C represent high order aspheric surface coefficients. It is noted that the shape of the aspheric surface may be determined by substituting actual values into K, A, B, and C of the above expression.

It is noted that in FIGS. 1 and 5 showing the lens structures of the wide-angle lenses according the first and second specific embodiments, which are described in greater detail below, the curvature radii of first through ninth faces of the wide-angle lens (including the face of the aperture I) are denoted as R1-R9, and the distances between the first though ninth faces are denoted as Z1-Z10.

Also, it is noted that in both of the first and second specific embodiments, the angle of view is set to 190 degrees.

First Specific Embodiment

The specifications of the wide-angle lens according to the first specific embodiment are indicated in the following table 1.

TABLE 1

| Face | Radius of Curvature | Distance | Refractive Index | Abbe Number | Aspheric Surface |
|---|---|---|---|---|---|
| 1 | 19.734 | 1.0 | 1.62004 | 36.3 | |
| 2 | 3.447 | 3.31 | | | |
| 3 | −4.285 | 1.0 | 1.83917 | 23.9 | |
| 4 | 8.383 | 0.4 | | | ※ |
| 5 | −36.489 | 1.5 | 1.61800 | 63.4 | |
| 6 | −2.390 | 0.2 | | | |
| 7 | ∞ (Aperture) | 0.2 | | | |
| 8 | 10.242 | 1.00 | 1.61800 | 63.4 | |
| 9 | −3.447 | 1.89 | | | |
| 10 | ∞ | 3 | 1.54600 | 55.0 | |
| 11 | Image Surface | | | | |

Data pertaining to the aspheric surface of the wide-angle lens according to the present embodiment are indicated in the following table 2.

TABLE 2

| Face | K | A | B | C |
|---|---|---|---|---|
| 4 | −97.078624 | 0.450558E−01 | 0.115498E−01 | 0 |

The focal lengths of the first through fourth lenses L1-L4 of the wide-angle lens according to the present embodiment are arranged as follows:

First Lens L1: negative focal length
Second Lens L2: negative focal length
Third Lens L3: positive focal length
Fourth Lens L4: positive focal length The overall focal length f of the wide-angle lens system according to the present embodiment and specific parameter values for the parameters described by the above-described conditions (1) through (5) are indicated in the following table 3.

TABLE 3

| Focal Length f | 1.641 |
|---|---|
| Condition (1) | 36.2 |
| Condition (2) | 23.9 |
| Condition (3) | 63.3 |
| Condition (4) | 63.3 |
| Condition (5) | 2.68 |

Figure 2:
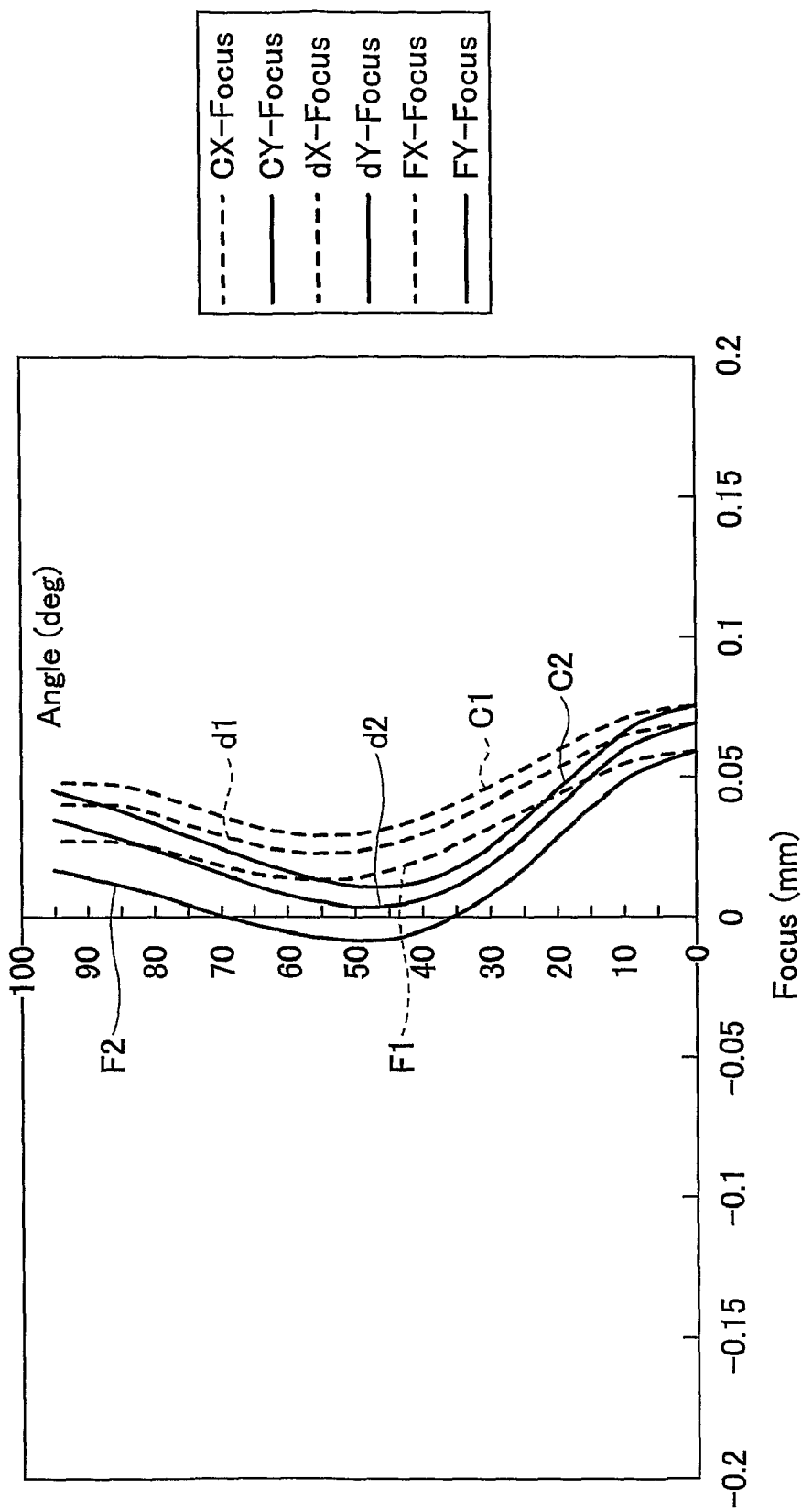
FIG. 2 is a graph showing exemplary astigmatism characteristics of the wide-angle lens according to the first specific embodiment.
Figure 3:
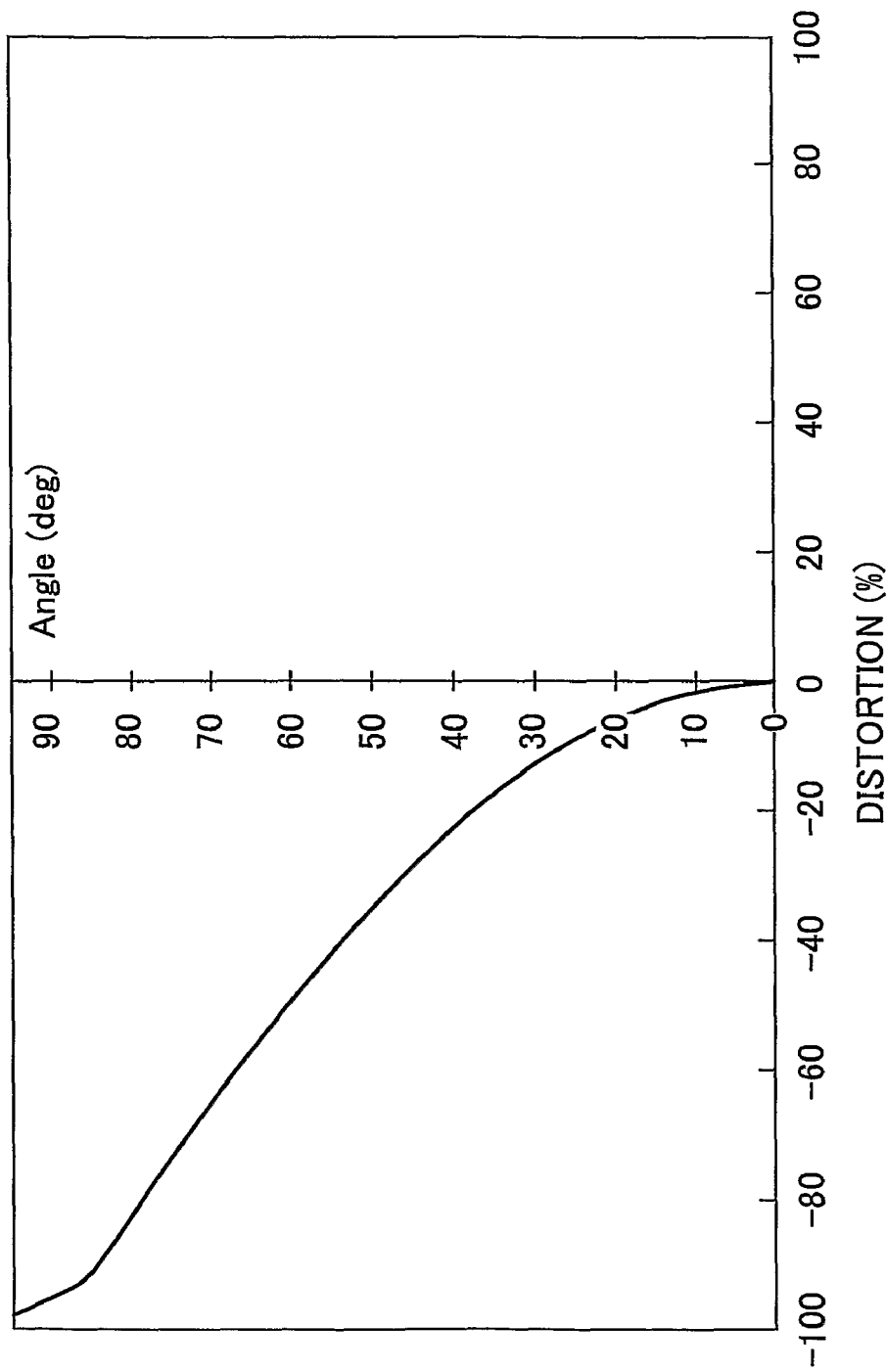
FIG. 3 is a graph showing exemplary distortion characteristics of the wide-angle lens according to the first specific embodiment.

FIG. 2 is a graph showing astigmatism characteristics of the wide-angle lens according to the first specific embodiment, FIG. 3 is a graph showing distortion characteristics of the wide-angle lens according to the first specific embodiment, and FIGS. 4A-4C are graphs showing coma characteristics of the wide-angle lens according to the first specific embodiment at differing relative field heights. It is noted that in the graphs of FIGS. 2 and 3, the vertical axis represents the angle of view. In the graphs of FIGS. 2 and 4, curves C1 and C2 represent corresponding characteristics in the sagittal direction and the tangential direction, respectively, for the C line; curves d1 and d2 represent corresponding characteristics in the sagittal direction and the tangential direction, respectively, for the d line; and curves F1 and F2 represent corresponding characteristics in the sagittal direction and the tangential direction, respectively, for the F line. Also, it is noted that FIGS. 6, 7, and 8A-8C are graphs similar to those of FIGS. 2, 3, and 4A-4C showing astigmatism characteristics, distortion characteristics, and coma characteristics, respectively, of the wide-angle lens according to the second specific embodiment described below.

Second Specific Embodiment

The specifications of the wide-angle lens according to the second specific embodiment are indicated in the following table 4.

TABLE 4

| Face | Radius of Curvature | Distance | Refractive Index | Abbe Number | Aspheric Surface |
|---|---|---|---|---|---|
| 1 | 8.135 | 1.0 | 1.80518 | 25.4 | |
| 2 | 2.700 | 1.52 | | | |
| 3 | −100.327 | 0.99 | 1.83917 | 23.9 | |
| 4 | 1.153 | 0.90 | | | ※ |
| 5 | 1.669 | 1.5 | 1.61800 | 63.4 | |
| 6 | −4.830 | 0.05 | | | |
| 7 | ∞ (Aperture) | 0.15 | | | |
| 8 | 1.735 | 1.00 | 1.51760 | 63.5 | |
| 9 | −49.237 | 1.12 | | | ※ |
| 10 | ∞ | 2 | 1.54600 | 55.0 | |
| 11 | Image Surface | | | | |

Data pertaining to the aspheric surfaces of the wide-angle lens according to the present embodiment are indicated in the following table 5.

TABLE 5

| Face | K | A | B | C |
|---|---|---|---|---|
| 4 | −1.053964 | 0.091096 | 0.032797 | 0.033619 |
| 9 | −17.603532 | 0.158307 | 0.022273 | −0.007512 |

The focal lengths of the first through fourth lenses L1-L4 of the wide-angle lens according to the present embodiment are arranged as follows:

First Lens L1: negative focal length
Second Lens L2: negative focal length
Third Lens L3: positive focal length
Fourth Lens L4: positive focal length The overall focal length f of the wide-angle lens system according to the present embodiment and specific parameter values for the parameters described by the above-described conditions (1) through (5) are indicated in the following table 6.

TABLE 6

| Focal Length f | 1.185 |
|---|---|
| Condition (1) | 25.4 |
| Condition (2) | 23.9 |
| Condition (3) | 63.4 |
| Condition (4) | 63.5 |
| Condition (5) | 2.21 |

Figure 11:
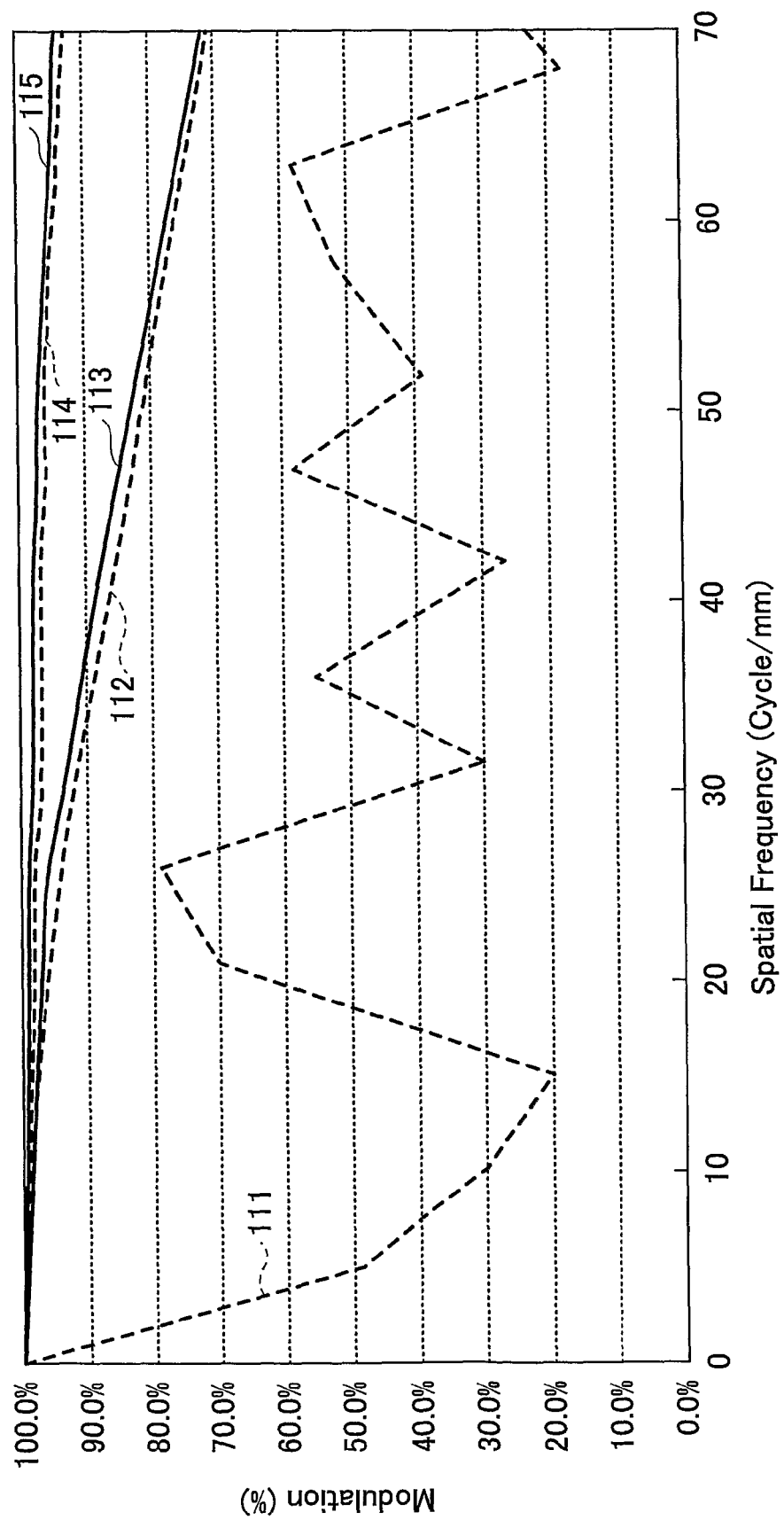
FIG. 11 is a graph showing exemplary results of performing image processes on image data according an embodiment of the present invention.

FIG. 11 is a graph illustrating results of performing the image processes described in relation to FIGS. 9 and 10 on image data captured using the wide-angle lens according to the second specific embodiment.

In the graph of FIG. 11, the horizontal axis represents the spatial frequency, and the vertical axis represents MTF characteristics of light intensity signals.

As is illustrated by curve 111 of this graph, when image processes are not performed on the captured image data, MTF degradation occurs at the high frequency band due to chromatic aberration of magnification. However, such degradation of the MTF characteristics may be corrected by performing the above-described image processes for correcting chromatic aberration of magnification, distortion, and MTF degradation.

Further, by performing high frequency component compensation on the image data using an FIR filter, a clearer image having desirable MTF characteristics even in a high frequency region may be obtained. It is noted that curves 112 and 113 shown in FIG. 11 represent MTF characteristics with respect to the sagittal direction and the tangential direction, respectively, in a case where correction of chromatic aberration of magnification is performed on the captured image data. Curves 114 and 115 of FIG. 11 represent MTF characteristics in the sagittal direction and the tangential direction, respectively, in a case where the processes for correcting the chromatic aberration of magnification, distortion, and MTF degradation are performed on the captured image data. As can be appreciated from this graph, highly accurate correction of MTF characteristics in the sagittal direction and the tangential direction may be enabled by performing the above-described processes for correcting chromatic aberration of magnification, distortion, and MTF degradation. Specifically, the contrast between the curve 111 and the curves 112-115 represent the corrections made by the signal processing circuits configured to perform the above-described image processes.

Although the present invention is described above with respect to certain preferred embodiments, the present invention is not limited to these specifically disclosed embodiments, and variations and modifications may be made without departing from the scope of the present invention.

The present application is based on and claims the priority date of Japanese Patent Application No. 2007-093188 filed on Mar. 30, 2007, and Japanese Patent Application No. 2008-035263 filed on Feb. 15, 2008, the entire contents of which are hereby incorporated herein by reference.

The invention claimed is:

1. A wide-angle lens comprising:
a front lens group and a rear lens group that are arranged in order from an object side toward an image side; and
an aperture being arranged between the front lens group and the rear lens group, wherein
the front lens group includes at least two lenses arranged toward the object side that have negative powers, and at least one lens arranged toward the image side that has a positive power,
the rear lens group includes at least one lens having a positive power,
one of the lenses of the front lens group arranged second in order from the object side has a lens face arranged into an aspheric surface,
the front lens group and the rear lens group are arranged into an image forming system having an angle of view greater than 180 degrees, and
the lens face arranged into an aspheric surface is the only lens face in the front lens group that is arranged into an aspheric surface.

2. The wide-angle lens as claimed in claim 1, wherein an image side lens face of the lens belonging to the rear lens group is arranged into an aspheric surface.

3. The wide-angle lens as claimed in claim 1, wherein the front lens group includes a first lens having a negative power, a second lens having a negative power, and a third lens having a positive power that are arranged in order from the object side toward the image side; and
the rear lens group includes a fourth lens having a positive power.

4. The wide-angle lens as claimed in claim 3, wherein an Abbe number of the first lens, denoted by vd1; an Abbe number of the second lens, denoted by vd2; an Abbe number of the third lens, denoted by vd3; and an Abbe number of the fourth lens, denoted by vd4 are arranged to satisfy conditions:

$$vd1 \leq 40; \tag{1}$$

$$vd2 \leq 25; \tag{2}$$

$$vd3 \geq 60; \text{ and} \tag{3}$$

$$vd4 \geq 6. \tag{4}$$

5. The wide-angle lens as claimed in claim 3, wherein a distance from a first lens face of the first lens to a second lens face of the fourth lens, denoted by OAL1; and a diameter of an image circle, denoted by IΦ, formed on an image surface of the image forming system are arranged to satisfy a condition:

$$OAL1/I\Phi \leq 2.68.$$

6. The wide-angle lens as claimed in claim 1, wherein at least one of the lenses of the front lens group and the rear lens group that has a strongest power is arranged to be a glass lens.

7. The wide-angle lens as claimed in claim 1, wherein all of the lenses are glass lenses.

8. The wide-angle lens as claimed in claim 1, wherein a lens face opposite the lens face arranged into an aspheric surface is disposed closer to the object side than the lens face arranged into an aspheric surface.

9. An image capturing apparatus comprising:
an optical system including a wide-angle lens having an angle of view greater than 180 degrees, the wide-angle lens including a front lens group and a rear lens group arranged in order from an object side toward an image side with an aperture being arranged between the front lens group and the rear lens group; the front lens group including at least two lenses arranged toward the object side that have negative powers, and at least one lens arranged toward the image side that has a positive power; and the rear lens group including at least one lens having a positive power; where one of the lenses of the front lens group arranged second in order from the object side has a lens face arranged into an aspheric surface; the lens face arranged into an aspheric surface is the only lens face in the front lens group that is arranged into an aspheric surface;

an image capturing unit that converts an object image formed by the optical system into image data;

a memory that stores the image data obtained by the image capturing unit;

a memory output control circuit that reads relevant image data corresponding to a designated angle of view from the memory;

a first signal processing circuit that performs distortion correction on the relevant image data for correcting influences of distortion of the optical system reflected in the relevant image data;

a second signal processing circuit that performs chromatic aberration of magnification correction on the relevant image data for correcting influences of chromatic aberration of magnification of the optical system reflected in the relevant image data; and a third signal processing circuit that performs modulation transfer function correction on the relevant image data for correcting influences of modulation transfer function characteristics of the optical system reflected in the relevant image data.

* * * * *